May 16, 1939. C. R. ALDEN 2,158,060
MACHINE TOOL AND HYDRAULIC OPERATING MECHANISM THEREFOR
Filed April 30, 1934 9 Sheets-Sheet 1
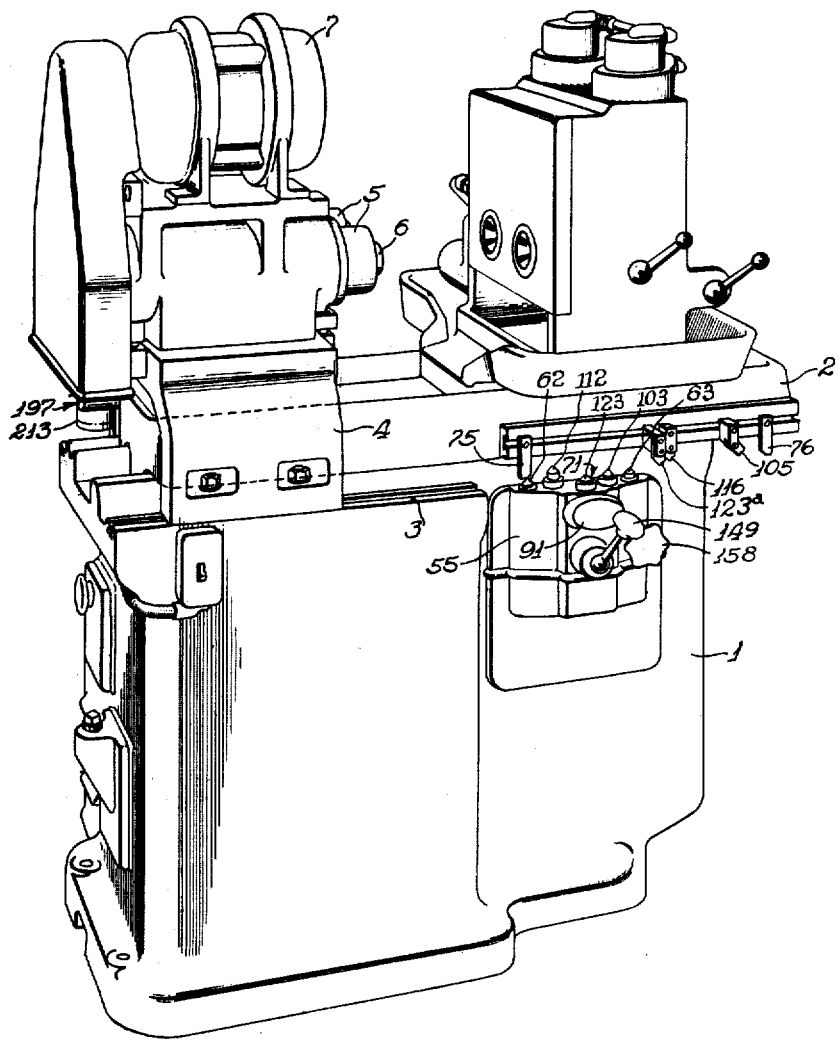
INVENTOR
Carroll R. Alden
By Chindall, Parker & Carlson
ATTORNEYS

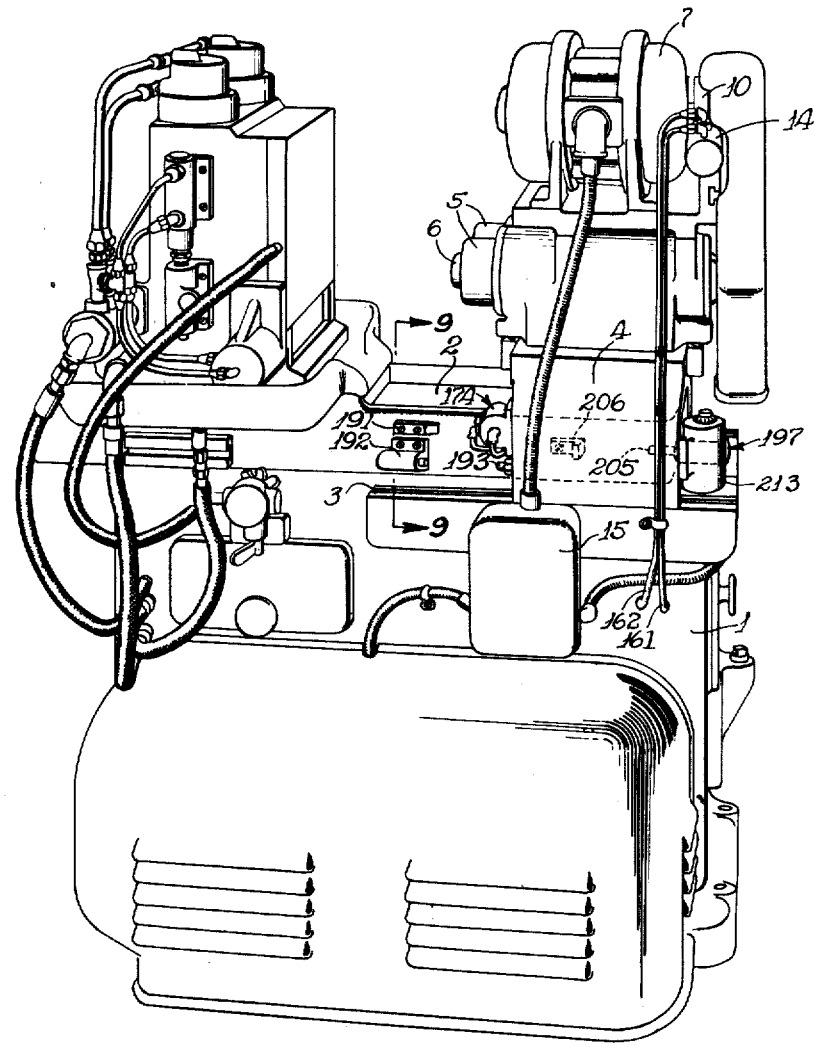

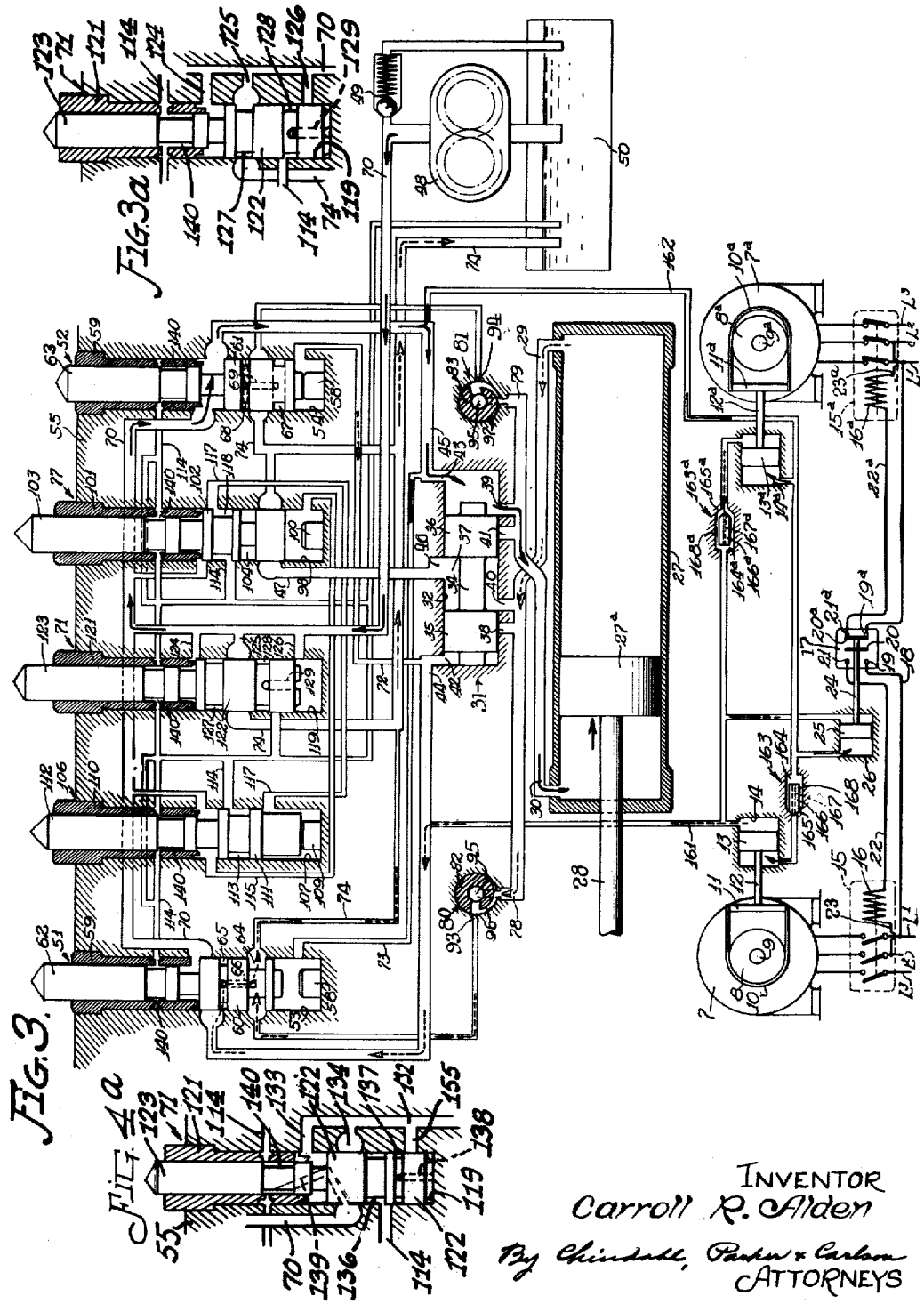

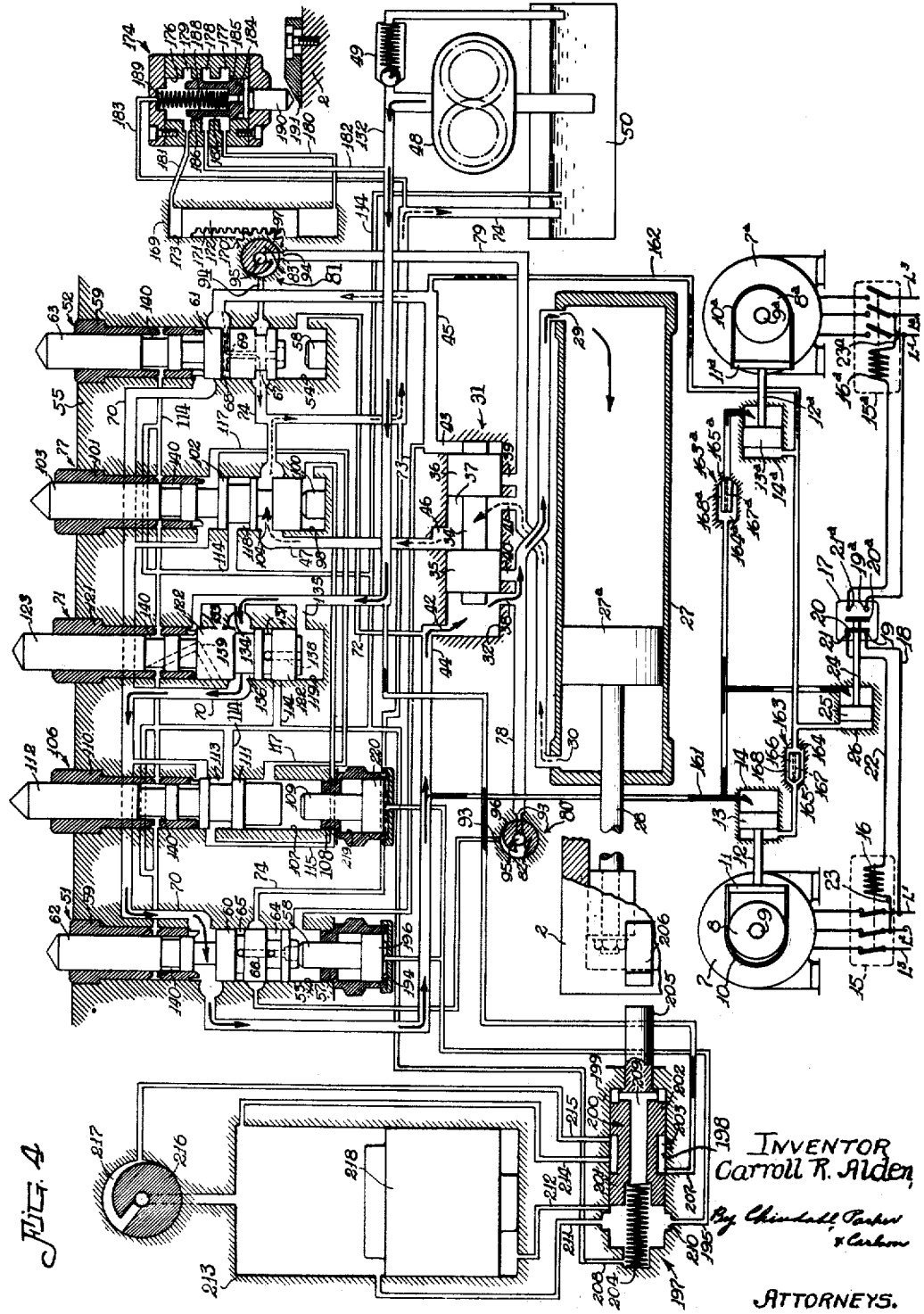

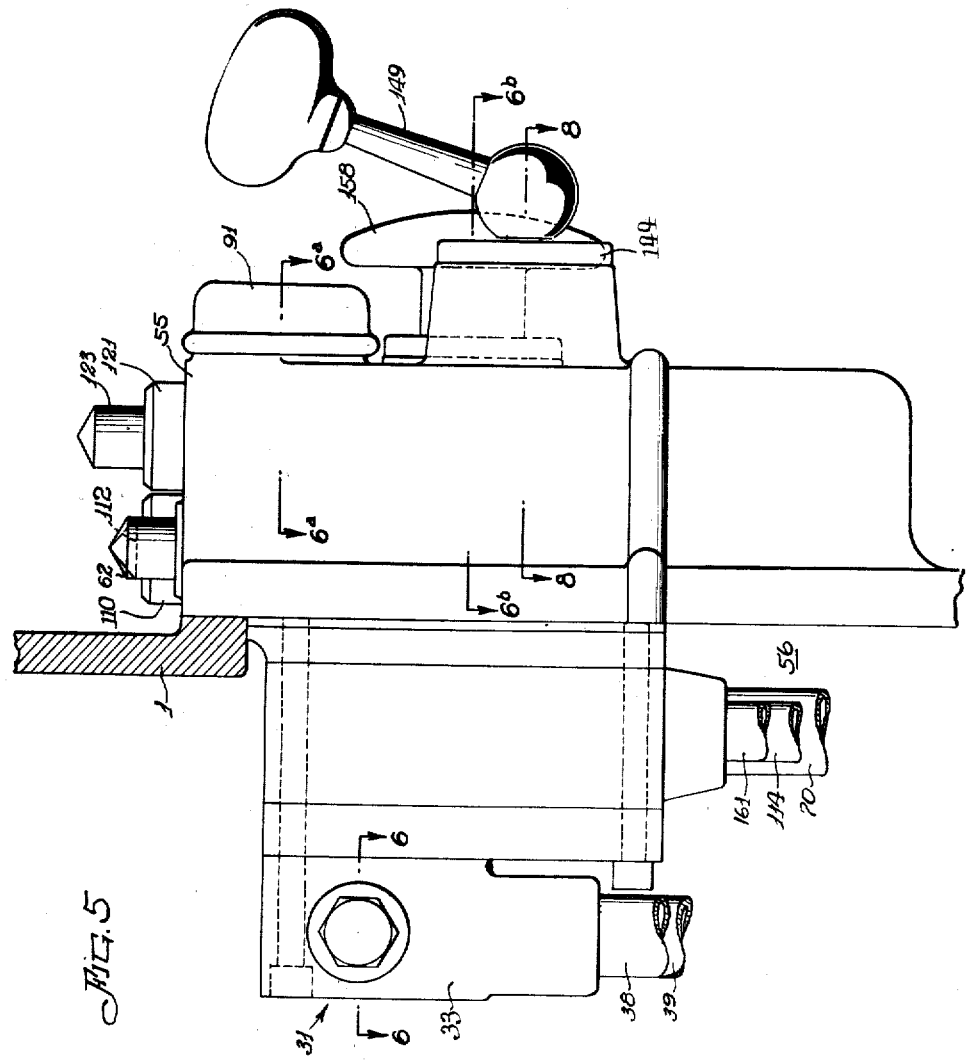

May 16, 1939.  C. R. ALDEN  2,158,060
MACHINE TOOL AND HYDRAULIC OPERATING MECHANISM THEREFOR
Filed April 30, 1934   9 Sheets-Sheet 6
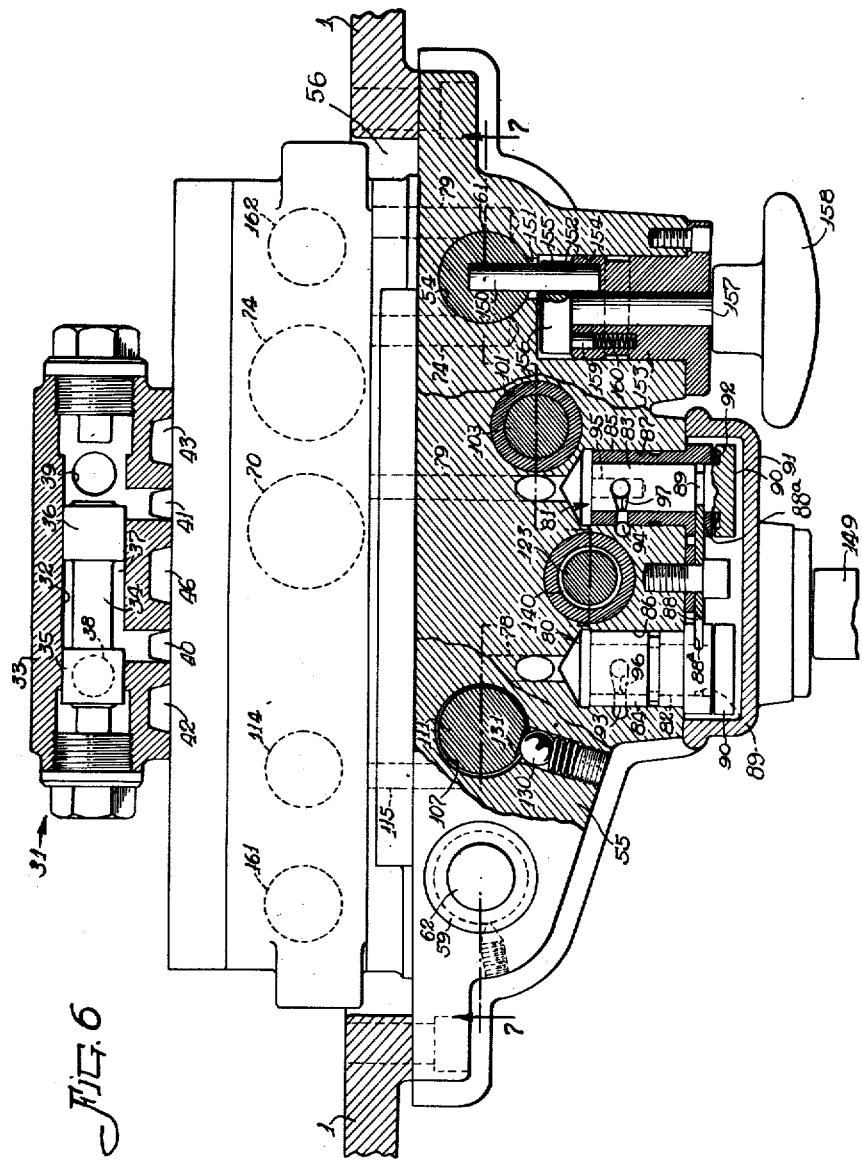
INVENTOR
Carroll R. Alden
By Chindell, Parker & Carlson
ATTORNEYS

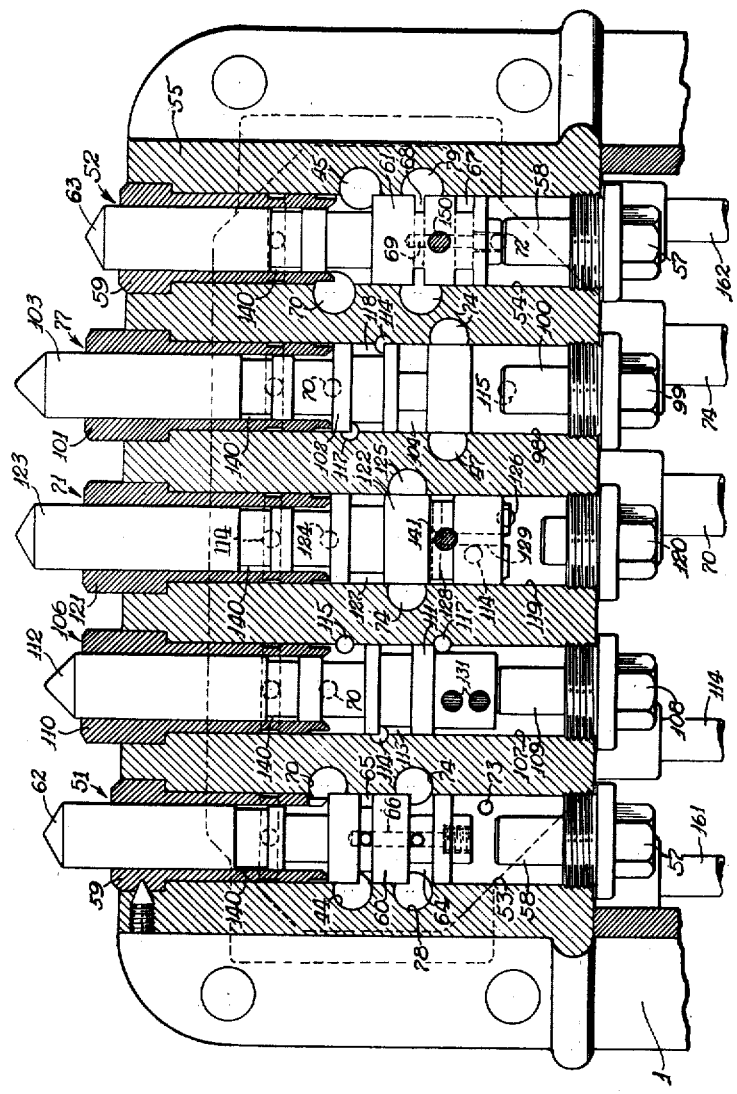

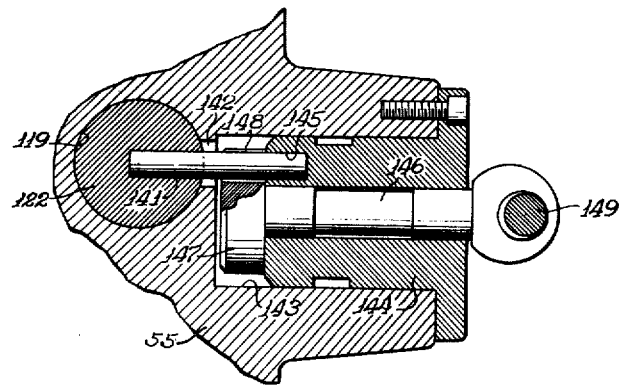
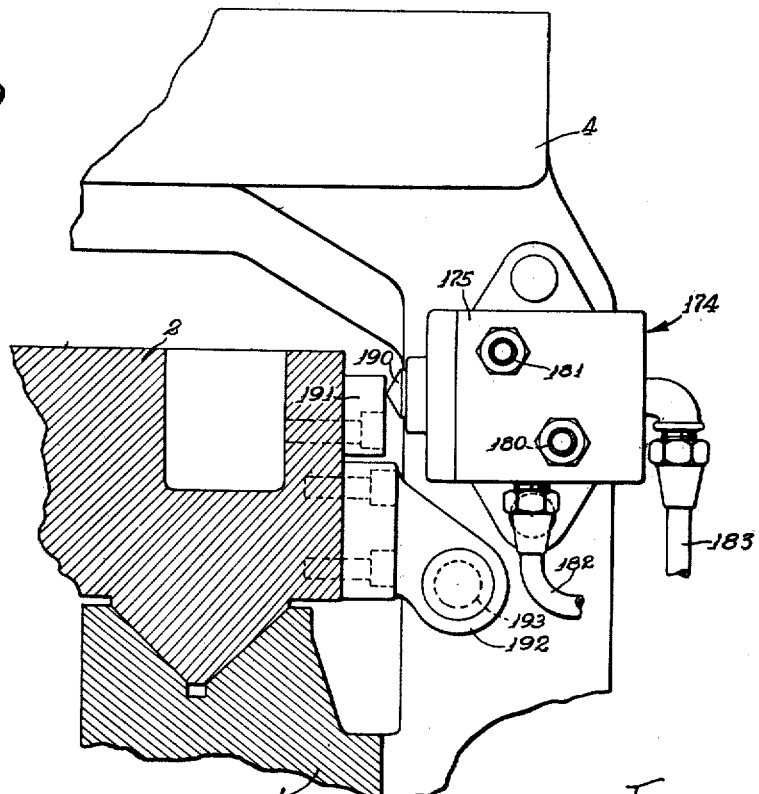

INVENTOR
Carroll R. Alden
ATTORNEYS

Patented May 16, 1939

2,158,060

UNITED STATES PATENT OFFICE 2,158,060

MACHINE TOOL AND HYDRAULIC OPERATING MECHANISM THEREFOR

Carroll R. Alden, Detroit, Mich., assignor to Ex-Cell-O Corporation, a corporation of Michigan Application April 30, 1934, Serial No. 723,135

26 Claims. (Cl. 121—45)

The present invention relates to improvements in machine tools, and has particular reference to a novel hydraulic operating mechanism of the general type disclosed in my copending application, Serial No. 599,427, filed March 17, 1932 (Patent No. 2,000,553).

One of the objects of the present invention resides in the provision, in a hydraulic operating mechanism for a translatory machine tool element, such as a reciprocatory carriage, selectively available to provide a rapid traverse or a relatively slow feed movement in either direction, of means selectively adjustable to obtain a slower rate of feed in either direction than in the opposite direction.

A more detailed object is to provide an hydraulic operating mechanism of the foregoing character comprising a reversible hydraulic motor, two fluid supply and discharge conduits connected respectively to the opposite ends of the motor, a pressure conduit and an unrestricted exhaust conduit, direction valve means for respectively connecting the first mentioned conduits reversibly to the pressure and supply conduits, two restricted exhaust conduits branching respectively from the first mentioned conduits in parallel with the unrestricted exhaust conduit and each including an independently adjustable feed control orifice, and valve means for opening and closing the unrestricted exhaust conduit to effect respectively a rapid traverse or the discharge of fluid from the motor through one or the other of the restricted exhaust conduits to obtain a slow feed.

Another object resides in the provision of novel means for automatically adjusting one of the feed control orifices to change the rate of feed during movement of the carriage in one direction through a predetermined range.

A further object resides in the provision, in a new and improved hydraulic operating mechanism comprising an hydraulic motor for reciprocating the carriage, a direction valve for controlling the operation of the motor, and two pilot reset valves responsive to the movement of the carriage respectively into opposite end positions for reversing the direction valve, of spindle brake and motor switch hydraulic actuators in parallel with the direction valve and controlled directly by the pilot reset valves.

A further object resides in the provision, in an hydraulic operating mechanism reversible under the control of dogs on the carriage, of a novel dwell mechanism operable upon rendering one of the dogs ineffective to provide a dwell at one end of the carriage movement, and then to automatically adjust the operating mechanism to reverse the movement of the carriage.

Still another object is to provide a new and improved hydraulic operating mechanism, comprising an automatic stop valve operable by the carriage, which is pressure relieved upon actuation of the stop valve.

A further object resides in the provision of a novel hydraulic operating mechanism having two pilot reset reversing valves and two pilot reset rapid traverse and feed control valves, operable selectively by the carriage, in which a reversal of the carriage in one direction may be obtained either by actuating one of the reversing valves in one direction or the other reversing valve in the opposite direction, and in which a change from rapid traverse to feed or vice versa may be obtained by actuating one of the control valves in one direction or the other control valve in the opposite direction.

Further objects and advantages will become apparent as the description proceeds.

In the accompanying drawings, Figure 1 is a front elevational view of a machine embodying the features of my invention.

Fig. 2 is a rear elevational view of the machine.

Fig. 3 is a diagrammatic representation of one form of the hydraulic operating mechanism with the parts adjusted for a slow feed traverse of the carriage to the right.

Fig. 3ª is a fragmentary view of one of the valves illustrated in Fig. 3 but showing same in its other position of adjustment.

Fig. 4 is a diagrammatic representation of another form of the hydraulic operating mechanism with the parts adjusted for a rapid traverse of the carriage to the left.

Fig. 4ª is a fragmentary view of one of the valves illustrated in Fig. 4 but showing same in its other position of adjustment.

Fig. 5 is a side elevational view of a unitary control structure mounted in the front of the machine, and enclosing the various direction and speed valves embodied in the system of Fig. 3.

Fig. 6 is a fragmentary plan view of the control structure, partially in composite section along lines 6—6, 6ª—6ª, and 6ᵇ—6ᵇ of Fig. 5.

Fig. 7 is a vertical sectional view taken substantially along broken line 7—7 of Fig. 6.

Fig. 8 is a fragmentary sectional view taken along line 8—8 of Fig. 5.

Fig. 9 is a fragmentary sectional view taken along line 9—9 of Fig. 2, and showing a feed control valve in side elevation.

Figure 10:
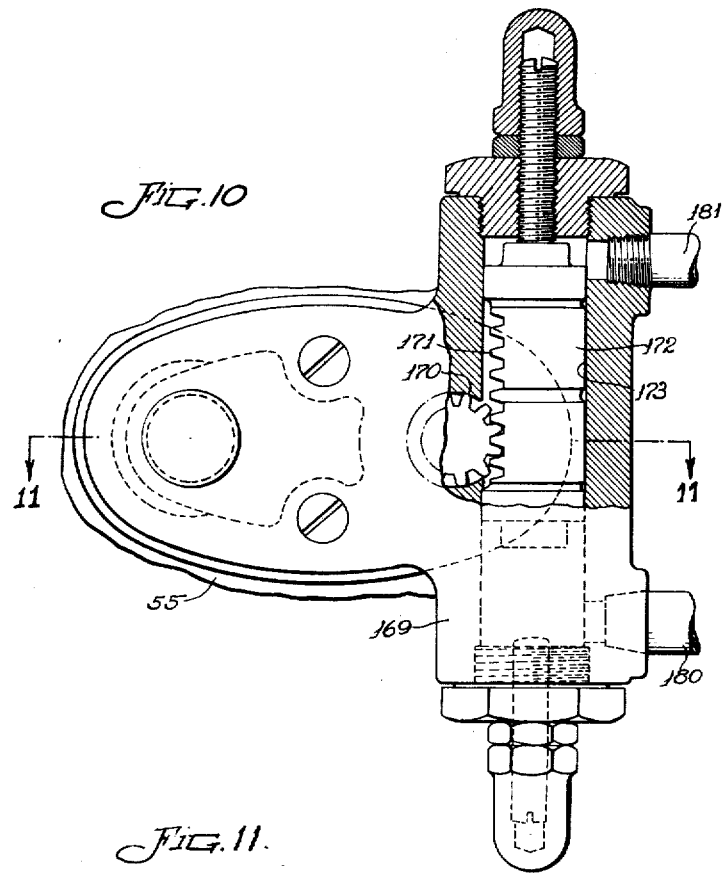

Fig. 10 is a front elevational view of a feed adjusting unit controlled by the feed valve.

Figure 11:
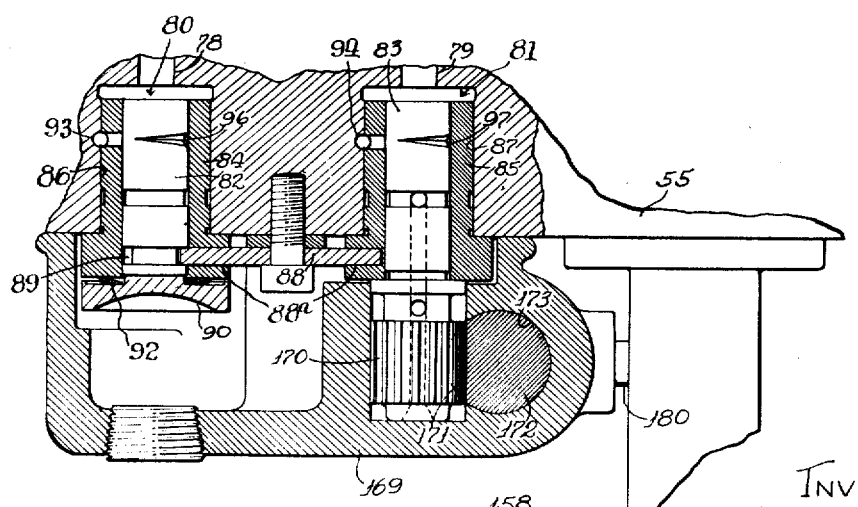

Fig. 11 is a transverse sectional view, taken along line 11—11 of Fig. 10, of the control structure shown in Fig. 5 with the feed adjusting unit attached.

Referring more particularly to the drawings, the invention, for purposes of illustration, is disclosed as embodied in a machine tool (see Figs. 1 and 2) comprising an elongated hollow base 1 on the top of which a carriage 2 is mounted for longitudinal reciprocation, and which is formed on the opposite sides of one end with auxiliary guideways 3 parallel to the direction of movement of the carriage. An inverted U-shaped bridge member 4 is rigidly mounted on the guideways 3 for adjustment longitudinally of the base 1, and serves as a support for one or more, for example two, parallel brackets 5. Rotary spindles 6 are journaled respectively in the brackets 5, and are adapted to be driven from a suitable source of power, such as an electric motor 7.

The motor 7 is provided with a suitable braking mechanism for stopping the rotation of the spindles 6. In the present instance, the braking mechanism comprises a brake drum 8 fixed on the motor shaft 9 (see Fig. 3), and a brake band 10 extending partially about the drum. The free ends of the band 10 are connected by a cross bar 11 fixed on one end of an actuating rod 12. A pressure fluid responsive piston 13 slidable in a cylinder 14 is directly attached to the rod 12, and upon reciprocation in opposite direction acts to apply and release the band 10.

Any suitable circuits may be provided for energizing the motor 7. In the present instance, the motor 7 is of the alternating current type, and is adapted to be connected to electric supply lines L1, L2 and L3 by a magnetic switch 15 having an actuating coil 16. A control switch 17 is adapted to close a circuit through the coil 16 as follows: from the main line L1, through a line 18, a fixed contact 19, a movable contact 20, a fixed contact 21, a line 22, the coil 16, and a line 23 to the main line L2. The movable contact 20 is operable through a reciprocatory rod 24 connected to a pressure fluid responsive piston 25 slidable in a cylinder 26.

It will be understood that a similar spindle head structure may be provided at the other end of the base 1 to constitute the machine tool one of the double end type similar to that disclosed in my said copending application. Figs. 3 and 4 illustrate a motor control circuit and a braking mechanism for such duplicate structure, and the corresponding parts thereof are identified by the same reference numerals distinguished by the exponent "a". Preferably, the movable contacts 20 and 20ª are connected for joint actuation so that upon movement of the piston 25 in one direction, the contact 20 will bridge the contacts 19 and 21 to institute the operation of the motor 7, and upon movement of the piston in the reverse direction, the contact 20ª will bridge the contacts 19ª and 21ª to institute operation of the motor 7ª.

The present invention relates primarily to an hydraulic operating mechanism for moving the carriage 2 and actuating the brake pistons 13 and 13ª and the switch piston 25. In its preferred form, the operating mechanism comprises an hydraulic motor (see Figs. 3 and 4) having a cylinder 27 mounted in fixed position within the base 1, and a piston 27ª reciprocable in the cylinder and connected through a piston rod 28 to the carriage 2. Opening from the cylinder 27 respectively at opposite sides of the piston 27ª are two fluid supply and discharge conduits 29 and 30 leading to a direction valve 31.

The direction valve 31 (see Figs. 3 and 6) may be of any desired construction, and preferably comprises an elongated cylinder bore 32 closed at opposite ends and formed in a valve casing 33. A valve piston 34 of the spool type, comprising axially spaced heads 35 and 36 separated by an annular space 37, is mounted for reciprocation in the bore 32. Opening through the casing 33 to the bore 32 intermediate its ends are two longitudinally spaced pressure ports 38 and 39, and, between the latter, two longitudinally spaced exhaust ports 40 and 41. These ports are so arranged that when the piston 34 is in one end position, the ports 38 and 41 will be closed by the heads 35 and 36, and the ports 40 and 39 will be open respectively to the space 37 and one end of the bore 32, and when the piston occupies the opposite end position, the ports 38 and 41 will be open respectively to the other end of the bore 32 and the space 37, and the ports 39 and 40 will be closed. The ports 38 and 40 are connected in parallel to the conduit 29, and the ports 39 and 41 are similarly connected to the conduit. Fluid supply and discharge ports 42 and 43 open respectively to opposite ends of the bore 32, and are connected to conduits 44 and 45. An exhaust port 46, connected to a conduit 47, opens to the bore 32 between the ports 40 and 41, and is always in communication with the space 37.

The conduits 44 and 45 are adapted to be connected respectively and reversibly by an automatic reset pilot direction control to a suitable source of pressure fluid, such as a constant flow pump 48 having a pressure relief overflow 49, and a drain, such as a sump 50, to control the position of the valve piston 34, and thereby the direction of operation of the motor piston 27ª. It will be evident that when the port 43 is connected to the pump 48 and the port 42 is connected to the sump 50, the valve piston 34 will be moved into its left hand position. Thereupon, fluid will be supplied to the conduit 30 and exhausted from the conduit 29 to effect movement of the piston 27ª and hence the carriage 2 to the right (see Fig. 3). Upon connecting the port 42 to the pump 48 and the port 43 to the sump 50 (see Fig. 4), the movement of the carriage 2 will be reversed.

The automatic reset pilot direction control (see Figs. 3, 4, 6 and 7) is responsive to the movement of the carriage 2, and comprises two valves 51 and 52 for effecting reversal of the carriage respectively to the left and right. These valves respectively comprise chambers or cylinder bores 53 and 54 which may be formed in any suitable casings, and which in the present instance open vertically through a plate or apron 55 secured to the front of the base 1 over an opening 56. Each of the cylinder bores 53 and 54 is closed at its lower end by a screw plug 57 having an upwardly projecting axial stop 58, and has a bushing 59 secured in its upper end.

Respectively disposed in the cylinder bores 53 and 54 for reciprocation between the stops 58 and the bushings 59 are two valve pistons 60 and 61 of the spool type provided respectively with actuating plungers 62 and 63 extending through the bushings for external engagement. The piston 60 is formed in its periphery with longitudinally spaced annular grooves 64 and 65 in communication with an axial passage 66. Similarly, the piston 61 has two longitudinally spaced peripheral grooves 67 and 68 opening to an axial passage 69.

A branched conduit 70 opens constantly to the bores 53 and 54 above the pistons 60 and 61, and is adapted to supply, subject to control by a stop valve 71, motive fluid under full pressure from the pump 48. The conduits 44 and 45 from the direction valve 31 open respectively to the cylinder bores 53 and 54 from selective connection with the pressure conduit 70 when the related pistons 60 and 61 are lowered against the stops 58, and with the grooves 65 and 68 when the pistons are raised against the bushings 59. Cross conduits 72 and 73 respectively branch from the conduits 44 and 45, and open constantly to the lower ends of the bores 54 and 53. Also opening to the bores 53 and 54 for communication respectively with the grooves 64 and 67 when the related pistons 60 and 61 are in their uppermost positions is a drain conduit 74 discharging to the sump 50.

The upper ends of the plungers 62 and 63 are beveled to constitute reversing abutments adapted for engagement by suitable control dogs 75 and 76 mounted on the front of the carriage 2.

Assuming that fluid under pressure is available in the conduit 70 and that the plunger 63 is depressed (see Fig. 3), pressure fluid will be supplied from the conduit 70, through the cylinder bore 54, and the conduit 45 to the right end of the direction valve bore 32, and from the conduit 45 through the cross conduit 73 to the lower end of the bore 53. Thereupon, the piston 60, by reason of its differential areas, will be raised into its uppermost position to connect the left end of the bore 32 and the lower end of the bore 54 through the conduits 44 and 72, the groove 65, the passage 66, and the groove 64 to the drain conduit 74. As a result, the plunger 63 will be retained in its lowermost position, and the direction valve piston 34 will be moved to the left to institute movement of the carriage 2 to the right. When the carriage 2 reaches its right limit position, the dog 75 will depress the plunger 62 to lower the valve piston 60, the fluid in the chamber 53 being backed up into the conduit 73 against the pressure in the connection to the source. Thereupon the conduits 44 and 72 will be connected to the pressure conduit 70 to elevate the valve piston 61, and then the conduits 45 and 73 will be connected to the drain conduit 74. This will reverse the direction valve 31 to institute movement of the carriage 2 to the left (see Fig. 4). At the left limit position, the dog 76 will again depress the plunger 63 to establish the initially described hydraulic circuits. It will be evident that each of the pilot valves 51 and 52 upon being actuated by the carriage 2 not only reverses the direction valve 31, but also resets the other pilot valve in operative position.

Provision is made for varying the rate of fluid discharge from the motor cylinder 27 to obtain a rapid traverse or a feed of the carriage 2 in each direction of movement. For rapid traverse, the exhaust fluid is always discharged through the direction valve 31 to the conduit 47 which is unrestricted, and which is adapted to be closed or connected to the drain conduit 74 by a rapid traverse valve 77. For feed, the exhaust fluid is adapted to be directed through one or the other of two restricted conduits 78 and 79 respectively branching from the conduits 29 and 30, and leading to the valves 51 and 52 for connection to the drain conduit 74 when the valve pistons 60 and 61 are elevated. Thus, assuming that the carriage 2 is moving to the right (see Fig. 3) and that the conduit 47 is closed by the valve 77, the conduit 79 will be closed by the valve 52 to maintain the pressure in the conduit 30, and fluid will be discharged from the cylinder 27 through the conduit 29, the conduit 78, and the groove 64 to the drain conduit 74, thereby effecting a slow feed. Conversely, under the same conditions but with the carriage 2 moving to the left, the conduit 78 will be closed, and fluid will be discharged from the cylinder 27 through the conduits 30 and 79 and the groove 67 to the drain conduit 74, thereby effecting a slow feed in the opposite direction. When the conduit 47 is open (see Fig. 4), the discharge of the fluid will be unrestricted to effect a rapid traverse.

The feed conduits 78 and 79 are restricted respectively by two orifice valves 80 and 81 (see Fig. 6) which are independently adjustable to vary the rate of feed in either direction. Therefore, since one or the other of the orifice valves 80 and 81, depending on the direction of carriage movement, is adapted to be in sole control of the rate of feed, the feed in either direction may be made faster or slower than in the other direction.

The orifice valves 80 and 81, in their preferred form respectively comprises two cylindrical valve plugs 82 and 83 rotatably adjustable in bushings 84 and 85 seated in parallel bores 86 and 87 in the front of the apron 55. A clamping plate 88 removably bolted to the apron 55, and extending at opposite ends respectively through slots 88ª in the bushings 84 and 85 into annular grooves 89 in the outer ends of the plugs 82 and 83 serves to retain these parts within the bores 86 and 87. The plugs 82 and 83 are provided respectively with adjusting heads 90 normally enclosed by a removable cover plate 91 on the front of the apron 55. Suitable springs 92 interposed between the outer ends of the bushings 84 and 85 and the heads 90 serve to take up any end play in the plugs 82 and 83.

The inner ends of the bores 86 and 87 are connected respectively to the conduits 78 and 79, and outlet ports 93 and 94 are respectively formed in the bushings 84 and 85 and connected to the pilot valves 51 and 52. The plugs 82 and 83 are formed respectively with axial passages 95 opening to the inner ends of the bores 86 and 87, and with peripherally tapered V-shaped groove orifices 96 and 97 opening to the closed ends of the passages 95, and rotatably adjustable longitudinally across the ports 93 and 94. It will be evident that the restrictions in the feed conduits 78 and 79 may be adjusted by varying the angular relationship of the orifices 96 and 97 to the ports 93 and 94. If the effective size of the opening through the orifice 96 is made less than that through the orifice 97, the carriage feed will be slower to the right than to the left. Conversely, if the portion of the orifice 96 across the port 93 is greater in width than the portion of the orifice 97 communicating with the port 94, the feed will be slower to the left than the right. Obviously, the rate of feed may be made equal in both directions.

The rapid traverse valve 77 comprises a cylinder bore 98 opening vertically through the apron 55, and closed at its lower end by a screw plug 99 with an inwardly projecting stop 100. A bushing 101 is fixed in the upper end of the bore 98. Slidably disposed in the bore 98 is a valve piston 102 having an axial plunger 103 extending upwardly through the bushing 101 for external actuation. The exhaust and drain conduits 47 and 74 open to the bore 98, and are adapted to be brought into communication through an annular groove 104 in the piston 102 when the latter is positioned against the stop 100, and to be blanked when the piston is in its outer end position. Hence, a rapid traverse will be obtained when the plunger 103 is down, and a feed movement will result when the plunger is up.

The rapid traverse valve 77 is adapted to be actuated through engagement of a dog 105 on the carriage 2 with the plunger 103 to institute rapid traverse, and to be elevated under the control of a pilot feed valve 106 to institute the feed. In the single end machine, the dog 105 is pivotal in one direction out of vertical center position to flip over the plunger 103 upon movement of the carriage 2 to the left, and is arranged to depress the plunger immediately after reversal of the carriage to the right. For a double end machine, two dogs 105 may be provided effective at opposite ends of the carriage movement.

The pilot feed valve 106 also comprises a cylinder bore 107 opening vertically through the apron 55, and closed at its lower end with a screw plug 108 having an inner stop 109. A bushing 110 is fixed in the upper end of the bore 107. Slidably disposed in the bore 107 is a valve piston 111 having an end plunger 112 extending upwardly through the bushing 110 for external actuation. The pressure conduit 70 opens constantly to the upper end of the bore 107. An annular groove 113 in the piston 111 is always in communication with a drain conduit 114 discharging to the sump 50. A cross conduit 115 opens from the bore 107 intermediate the conduits 70 and 114 to the lower end of the bore 98, and is adapted to be connected to the conduit 70 when the piston 111 is depressed and to the conduit 114 when the piston is elevated. Hence, when the feed plunger 112 is depressed, the traverse plunger 103 will be reset and held in its uppermost position.

The pilot feed valve 106 is adapted to be actuated by engagement of a dog 116 on the carriage 2 with the plunger 112 to institute the feed, and to be reset into and held in operative position when the rapid traverse is instituted by depressing the plunger 103. In this connection, it is to be noted that when the plunger 103 is depressed as shown in Fig. 4, a connection will be established from the pressure line 70 through the valve 77, and the line 117 to the bore 107, thereby resetting the valve 106, and thereupon the lines 114 and 115 are connected to retain the valve 106 in position. For a double end machine, two dogs 116 respectively adapted to depress the plunger 112 during the travel of the carriage 2 in opposite directions may be provided.

The pressure conduit 70 opens to the upper end of the valve bore 98, and the drain conduit 114 opens to the same bore at a lower point. A cross conduit 117 opens from the lower end of the valve bore 107 to the bore 98 intermediate the conduits 70 and 114. The cross conduit 117 is adapted to be connected with the pressure conduit 70 when the piston 102 is down to reset the valve 106, and with the drain conduit 114 through an annular groove 118 in the piston 102 when the latter is up.

Thus, the two valves 77 and 106 act as pilot valves for alternately resetting each other. Either valve when reset will cause the other to be held down.

The two forms of the hydraulic system disclosed respectively in Figs. 3 and 4 are alike up to the present point in the specific description, and differ as to the character and function of the stop valve 71. In the first system, designated as the pressure relieved system, the stop valve 71 when actuated to stop the carriage 2 is operative to connect the pressure conduit 70 to the drain conduit 74. This has the advantage that when the machine is idle, the pump is not obliged to deliver fluid against the working pressure normally present in the system. Hence, less power is required, and the dissipation of energy in the form of heat within the machine is substantially avoided. In the second system, designated as the pressure maintained system, the stop valve 71 is operative to disconnect the pressure conduit 70 from the pump 48, and thereby to trap the motive fluid within the system. This has the advantage that sufficient pressure is available when desired for operating various hydraulic fixtures that may be used on the machine, for example work fixtures and clamps. In each instance, the stop valve 71 comprises a chamber or bore 119 opening vertically through the apron 55, with a screw plug 120 closing the lower end and a bushing 121 seated in the upper end, and a valve piston 122 reciprocable in the bore and having a plunger 123 extending upwardly through the bushing for external actuation.

The plunger 123 is adapted for engagement by a dog 123ª pivotal in one direction, for example to the right, out of vertical position on the front of the carriage 2. In the single end machine, the dog 123ª is positioned to depress the plunger 123 upon movement of the carriage 2 away from the spindle head structure 4, 5, 6 into a remote inoperative position. For the double end machine, the dog 123ª may be positioned midway of the dogs 75 and 76, and may be inoperative to depress the plunger 123 in one direction of carriage movement, for example to the left, so that the carriage cycle may comprise movement from an inoperative intermediate position into one end position, then a reverse movement past the intermediate position into the other end position, and then a return movement to the intermediate position. It will be understood that if the dog 123ª is removed or rendered inoperative, the carriage 2 will reciprocate continuously.

A specific selection and arrangement of reversing, traverse control and stop dogs, for single and double end machines has been disclosed. The invention however is not limited to any particular carriage program, the latter being adapted for variation by the selection and arrangement of carriage dogs to suit the working requirements of the machine. If a substantial number of dogs are required, and these are closely spaced, some of the dogs may be mounted on an auxiliary support (not shown) adapted to be attached to the carriage 2.

Referring first to the valve 71 illustrated in Fig. 3, the pressure conduit 70 is connected directly to the discharge of the pump 48, and has three parallel branches 124, 125 and 126 opening respectively to the valve bore 119 at the upper end, an intermediate point, and the lower end. The exhaust conduit 74 opens to the valve bore 119 in the same transverse plane as the branch conduit 125. The piston 122 when in its uppermost position blanks the conduits 74 and 125, and is held in position by the differential pressure acting on its opposite ends. In this position of the piston 122, the system is at full pressure, and hence operative. The piston 122 is formed with an annular groove 127 adapted to connect the conduits 74 and 125 to relieve the pressure when the piston is in its lowermost position.

The auxiliary drain conduit 114 also opens to the bore 119 at a point between the branch conduits 125 and 126 and is adapted to be connected to the lower end of the bore through an annular groove 128 and a bleed passage 129 formed in the piston 122 when the latter is depressed. The purpose of the bleed connection is to permit the piston 122 to move way down into its lowermost position. When the plunger 123 is depressed to connect the conduits 74 and 125, the piston 122 will close the conduit 126 so that the pressure in the lower end of the bore 119 will be completely dissipated. Hence, the piston 122 will remain in its inoperative position as illustrated in Fig. 3a.

In the pressure relieved system, when the plunger 123 is depressed to stop the carriage 2, one or the other of the valve pistons 102 and 111 will occupy its uppermost position. To prevent this piston from dropping under its own weight after pressure relief, one of these pistons, for example the feed valve piston 111, is adapted to be held yieldable in either end position by a spring pressed ball detent 130 (see Figs. 6 and 7) engaging selectively in two longitudinally spaced recesses 131 in the body of the piston. A similar construction may be provided in the pressure maintained system to hold the pistons 102 and 111 in position of adjustment in the event that the pressure is dissipated by leakage.

Referring now to Fig. 4, the pump 48 discharges to a delivery conduit 132 which has three parallel branches 133, 134 and 135 opening to the bore 119 respectively at the upper end, an intermediate point and the lower end. The pressure conduit 70 opens to the bore 119 in the same transverse plane as the conduit 134. The piston 122 is formed with an annular groove 136 for connecting the conduits 70 and 134 when in elevated position, and is adapted to blank these conduits as well as the conduit 135 when depressed as illustrated in Fig. 4a. As in the first form, the auxiliary drain conduit 114 opens to the bore 119 at a point between the conduits 134 and 135, and is adapted to be connected through an annular groove 137 and a bleed passage 138, formed in the piston 122, to the lower end of the bore when the piston is depressed.

A restricted bleed passage 139 formed in the piston 122 opens at one end to an annular groove 140 in the plunger 123 which is always open to the auxiliary drain conduit 114. The other end of the passage 139 is movable into communication with the pressure conduit 70 when the piston 122 is lowered. The passage 139 serves to relieve the pressure in the pressure end of the motor cylinder 27 when the valve 71 is closed, thereby preventing the carriage 2 from creeping.

Similar grooves 140 are formed respectively in the plunger 123 of the pressure relieved system and in each of the plungers 62, 63, 112 and 103 of both systems, and are in constant communication with the drain conduit 114 to lead off any fluid tending to leak through the associated bushings.

Means is provided for elevating the stop plunger 123 manually to start the operation of the machine. This means (see Fig. 8) preferably comprises a pin 141 anchored in one side of the piston 122, and extending transversely therefrom through a slot 142 in the wall of the bore 119 into the inner end of a bore 143 formed in the front of the apron 55. A bushing 144 is secured in the outer end of the bore 143, and is formed in its inner end with a straight groove 145 in which the free end of the pin 141 is guided for vertical movement while being held against angular movement. A rock shaft 146 is journaled in the bushing 144, and has a crank disk 147 on its inner end formed with a notch 148 engaging the pin 141. Secured on the outer end of the shaft 146 is an operating lever 149 which in its opposed positions is located at one side or the other of its axis. The weight of the lever 149 therefore tends to hold the valve 71 in either position of adjustment.

Reversal of the movement of the carriage 2 normally is effected automatically by the dogs 75 and 76. To permit manual reversal at will, means is provided for reversing the valves 51 and 52 without regard to the position of the carriage 2. This means (see Fig. 6) is shown as applied to the valve 52, and preferably is similar in construction to the manual actuator for the valve 71. Thus, it comprises a pin 150 which is fixed to, and extends transversely from the piston 61 through a slot 151 in the bore 54 into a vertical notch 152 in the inner end of a bushing 153 secured in a bore 154 in the apron 55, and which engages in a notch 155 in a crank disk 156 on the inner end of a rock shaft 157 journaled in the bushing. A hand knob 158 is secured to the outer end of the shaft 157. A spring pressed friction plunger 159, mounted in a bore 160 in the inner end of the bushing 153, engages the adjacent face of the disk 156, and serves to hold the valves 51 and 52 in position of adjustment when the operating pressures are dissipated, as for example when the pressure relieved system is inoperative or in the event of leakage over a period of time from the pressure maintained system.

The brake cylinders 14 and 14a are reversely connected in parallel with each other and with the direction valve 31 across the conduits 44 and 45 under the direct control of the valves 51 and 52. Similarly, the switch cylinder 26 is connected in parallel with the brake cylinders 14 and 14a. Hence, when the carriage 2 in the single end machine is reversed to move toward the spindle head structure (see Fig. 4), the brake band 10 will be automatically released and the circuit through the coil 16 will be closed. Conversely, upon reversal of the carriage 2 to move in the opposite direction (see Fig. 3), the brake band 10 will be applied and the motor 7 will be rendered inoperative.

In the double end machine, the operation is the same for the motor 7a and the brake band 10a with reference to the opposite spindle head structure. Thus, the brake band 10a is applied and the coil 16a is deenergized when the band 10 is released and the coil 16 is energized, and vice versa.

The hydraulic circuits, more particularly, comprise a branched conduit 161 opening from the conduit 44 respectively to the outer end of the cylinder 14, the inner end of the cylinder 14a and one end of the cylinder 26, and a second branched conduit 162 opening from the conduit 45 respectively to the opposite ends of the cylinders 14, 14a and 26. By reason of their parallel arrangement with the direction valve 31, the hydraulic actuators for the brakes and the motor control switches are operable without delay, without first awaiting reversal of the valve 31, upon instituting the reversal of the carriage 2 in either direction tion. Moreover, they are always subject to a substantial pressure differential under all conditions of machine operation since the opposite ends of each cylinder are always connected respectively to the high pressure side of the system and the drain.

To prevent either of the brake bands 10 and 10a from being applied before the associated motor switch is opened, one-way bleed valves 163 and 163a are interposed in the conduits 162 and 161 respectively at the inlets to the inner ends of the cylinders 14 and 14a. The bleed valve 163 comprises a chamber 164 having a valve seat 165 opening to the small end of the cylinder 14. Slidable in the chamber 164 is a free floating valve member 166 which has a restricted passage 167 always open to the cylinder 14, and a plurality of longitudinal flutes 168 for the free passage of fluid adapted to be closed by the seat 165. When fluid under pressure is supplied to the conduit 162, the piston 25 will be actuated immediately to open the switch contacts 19, 21 and 20. The piston 13 will also be actuated to apply the brake band 10, but its movement will be retarded by the valve 163. Upon supplying fluid under pressure to the conduit 161, both pistons 13 and 25 will be actuated simultaneously in the opposite direction. The valve 163a preferably is the same in construction as the valve 163 and hence the corresponding parts are identified by the same reference numerals with the exponent "a". The brake and switch means for controlling the operation of the spindle motors 7 and 7a forms the subject matter of and is claimed in my copending divisional application Serial No. 218,898, filed July 13, 1938.

For certain kinds of work, it may be desirable to vary the rate of feed of the carriage 2 in one or the other or both directions. Such is the case particularly where the distance between two work surfaces to be machined is not great enough to warrant the institution of the rapid traverse drive, or where two work surfaces have different machining requirements. In the present instance, a suitable means is illustrated in Figs. 4 and 9 to 11 for automatically adjusting the orifice valve plug 83 upon movement of the carriage 2 through a predetermined zone to the left. To control the rate of feed to the right, a similar means may be substituted for adjusting the orifice valve plug 82. For a control in both directions, duplicate means may be provided respectively for the two plugs 82 and 83. While the feed control means is illustrated as embodied in the pressure maintained system, it is equally well adapted for the pressure relieved system of Fig. 3.

The feed control means in its preferred form comprises a housing 169 adapted to replace the cover plate 91, and a valve plug similar to the plug 83 except that it is provided with a pinion 170 in place of the head 90. The pinion 170 extends into the housing 169, and meshes with a gear rack 171 formed on one side of a piston 172. The latter is freely reciprocable within a vertical cylinder 173 integral with one end of the housing 169, and is under the control of a slide valve 174 mounted on the bridge member 4 at the rear of the base 1.

The slide valve 174 comprises a bracket 175 formed with a cylindrical valve bore 176 extending transversely of the carriage 2. Three longitudinally spaced ports 177, 178 and 179 open to the bore 176, and of these, the end ports 177 and 179 are connected respectively through conduits 180 and 181 to the opposite ends of the cylinder 173, while the intermediate port 178 is connected through a conduit 182 to the pressure delivery conduit 132 of the pump 48. The outer end of the bore 176 is connected through a conduit 183 to the drain conduit 74.

Reciprocably disposed in the bore 176 is a valve piston 184 formed with two axially spaced collars 185 and 186 defining a peripheral groove 187, and with an axial passage 188 open to its opposite ends. A coiled compression spring 189 seated in one end of the passage 188 tends to move the piston 184 into its left end position as viewed in Fig. 9 in which the groove 187 serves to connect the ports 177 and 178 and the collar 186 uncovers the port 179 for direct communication with the exhaust conduit 183. The connections thus established serve to adjust the orifice valve into one position, namely the slow feed position. The piston 184 is adjustable into its opposite end position against the action of the spring 189 by an axial plunger 190 extending externally of the bore 176 for engagement by a beveled cam 191 removably and adjustably mounted on the carriage 2. In this position of the piston 184, the groove 187 serves to connect the ports 178 and 179, and the collar 184 uncovers the port 177 for communication through the passage 188 with the exhaust conduit 183. Thereupon the orifice valve 81 is adjusted into its rapid feed position.

In some instances, for example when it is desired first to bore and then to end face the work, it is desirable to obtain a dwell at one end of the carriage movement. Fig. 4 illustrates a suitable mechanism, optionally available upon rendering the reversing dog 76 inoperative, for effecting a predetermined dwell before automatic reversal upon movement of the carriage 2 into its left end position. A similar mechanism may be provided if desired to effect a dwell at the other end position of the carriage 2 upon rendering the dog 75 inoperative to reverse the drive. The mechanism may be duplicated for dwells at both ends of the carriage movement, and is adaptable to both hydraulic systems herein disclosed.

Referring to Figs. 4 and 9, a bracket 192 adjustably mounted on the rear of the carriage 2 is located to engage a fixed stop 193 on the bridge member 4 upon movement of the carriage to the left past the end position normally defined by the dog 76. Engagement of the bracket 192 with the stop 193 defines the dwell position of the carriage 2, and hence the work piece may be properly located by mounting it accurately in relation to the bracket.

The carriage 2 is reversed after a predetermined dwell period by elevating the valve piston 60. Thus, the dwell mechanism comprises a cylinder 194 formed in the screw plug 57, and connected at its lower end to a fluid supply conduit 195. A piston 196 is slidably mounted for vertical reciprocation in the cylinder 194, and carries the stop 58. When the piston 196 is in its lowermost position, the stop 58 acts in its normal capacity as heretofore described. When the piston 196 is elevated, the stop 58 elevates the piston 60, and thereupon the lower end of the bore 54 is connected to exhaust through the conduits 72, 44 and 74 so that the piston 61 in response to the pressure entering the upper end of the bore 54 from the conduit 70 is moved into its lowermost position as if it were depressed by the dog 76. The supply of fluid under pressure to the conduit 195 is under the control of a dwell valve 197 operable by the carriage 2 as the latter moves into its dwell position.

The dwell valve 197 comprises a cylindrical bore 198 formed in a casing 199 on the bridge member 4 and extending axially in the direction of carriage movement. A valve piston 200, having two spaced heads 201 and 202 defining an intermediate annular space 203, is slidably disposed in the bore 198, and is normally urged by a spring 204 into an inoperative end position toward the carriage 2. The piston 200 is provided with an actuating plunger 205 normally extending fully projected from the bore 198 for end engagement by a stop 206 on the carriage 2, and upon such engagement is movable against the action of the spring 204 into its operative opposite end position.

Opening to the bore 198 and the space 203 for all positions of the piston 200 is a supply conduit 207 connected to the conduit 132. A drain conduit 208 branching from the conduit 114 opens to one end of the bore 198, and then through an axial passage 209 in the piston 200 to the other end of the bore. The conduit 195 opens to a continuous inner peripheral groove 210 in the end of the bore adjacent the conduit 208. Two conduits 211 and 212 open respectively from the groove 210 and from the bore 198 intermediate the conduits 195 and 207, and respectively to one end and an intermediate point of a relatively large capacity cylinder 213. Two other conduits 214 and 215 open in spaced relation from the bore 198 at the opposite side of the conduit 207 to the other end of the cylinder 213. Interposed in the conduit 215 is a rotatably adjustable orifice valve 216 having a peripherally tapered V-shaped groove 217 defining a restricted orifice. A piston 218 is freely reciprocable in the cylinder 213, and in its opposite end positions is adapted to be located respectively between the conduits 211 and 212, and 211 and 214.

When the piston 200 is in inoperative position, the conduits 195, 211 and 212 are open to the drain conduit 208, the conduits 214 and 215 are open to the space 203, and the conduits 211 and 214 are in communication through the cylinder 213. Upon movement of the piston 200 into operative position by the carriage 2, the conduit 214 is closed by the head 202, the restricted conduit 215 is connected to the exhaust, and the conduit 212 is connected through the space 203 to the pressure conduit 207. Hence, the piston 218 is moved slowly toward the valve 216, thereby affording the desired delay required for the carriage dwell. As soon as the conduit 211 is uncovered by the piston 218, fluid under pressure is directed to the conduit 195 to elevate the direction valve piston 60, and thereby institute the return movement of the carriage 2. Thereupon, the piston 200 is returned into inoperative position, and in the course of its movement, the conduits 214 and 212 are connected respectively to the pressure and exhaust conduits 207 and 208 to return the piston 218 quickly into initial position.

To provide means for instituting rapid traverse immediately before reversal of the carriage 2, the screw plug 108 is formed with a vertical cylinder 219 of larger diameter than the cylinder 194, and also connected to the conduit 195. A piston 220 is reciprocable in the cylinder 219 and carries the stop 109 which is the same in diameter as the stop 58. It will be seen that, since the piston 220 is larger than the piston 194, the differential lifting areas of the two pistons are unequal. When fluid under pressure is supplied to the conduit 195, fluid at the same pressure will be supplied to the cylinders 194 and 219, both pistons 196 and 220 will be actuated, but the latter by reason of its greater pressure differential area will rise the most quickly. Elevation of the feed valve piston 111 will cause the piston 102 to move into its lowermost position as if it had been depressed by the dog 106. When the pressure in the cylinders 194 and 219 is dissipated, the pressure in the lower ends of the bores 53 and 107 will return the stops 58 and 109 into their normal positions. It will be understood that when both reversing dogs 75 and 76 are in operative position, the dwell mechanism will be inoperative, and will not affect the normal operation of the hydraulic system.

Patentable subject matter common to this application and my copending application Serial No. 690,525, filed September 22, 1933, is claimed in my said application Serial No. 690,525.

I claim as my invention:

1. An hydraulic operating mechanism for a reciprocable element of a machine tool comprising, in combination, a reversible hydraulic piston and cylinder motor for reciprocating said element, a reversible direction valve having a free moving piston, a source of fluid under pressure, two pressure passages adapted for connection to said source and leading respectively to said valve at opposite sides of said valve piston, two supply passages leading from said valve between said pressure fluid passages respectively to opposite ends of said motor, an exhaust passage leading from said valve between said supply passages, said valve piston in one end position serving to connect one of said supply passages to one of said pressure passages and the other of said supply passages to said exhaust passage, and in the other end position to connect said other supply passage to the other of said pressure passages and said one supply passage to said exhaust passage, two restricted passages branching respectively from said supply passages, and pilot valve means interposed in said pressure passages and also in said restricted passages and selectively operable to open either pressure passage to said source and connect the other pressure passage and associated restricted passage to said exhaust passage whereby to control said valve piston.

2. An hydraulic operating mechanism for a reciprocable element of a machine tool comprising, in combination, a reversible hydraulic piston and cylinder motor for reciprocating said element, a reversible direction valve having a free moving piston, a source of fluid under pressure, two pressure passages adapted for connection to said source and leading respectively to said valve at opposite sides of said valve piston, two supply passages leading from said valve between said pressure passages respectively to opposite ends of said motor, an exhaust passage leading from said valve between said supply passages, said valve piston in one end position serving to connect one of said supply passages to one of said pressure passages and the other of said supply passages to said exhaust passage and in the other end position to connect said other supply passage to the other of said pressure passages and said one supply passage to said exhaust passage, and two pilot valves interposed respectively in said pressure passages and adapted for selective actuation by said element, each of said pilot valves upon being actuated by said element acting to open the associated pressure passage to said source and to effect movement of the other pilot valve into position to connect the other pressure passage to said exhaust passage whereby to control said valve piston.

3. An hydraulic operating mechanism for a reciprocable element of a machine tool comprising, in combination, a reversible hydraulic piston and cylinder motor for reciprocating said element, a reversible direction valve having a free moving piston, a source of fluid under pressure, two pressure passages adapted for connection to said source and leading respectively to said valve at opposite sides of said piston, two supply passages leading from said valve between said pressure passages respectively to opposite ends of said motor, an exhaust passage leading from said valve between said supply passages, said valve piston in one end position serving to connect one of said supply passages to one of said pressure passages and the other of said supply passages to said exhaust passage and in the other end position to connect said other supply passage to the other of said pressure passages and said one supply passage to said exhaust passage, two pilot valves interposed respectively in said pressure passages and adapted for selective actuation by said element, each of said pilot valves upon being actuated by said element acting to open the associated pressure passage to said source and to effect movement of the other pilot valve into position to connect the other pressure passage to said exhaust passage whereby to control said valve piston, and a stop valve adapted for actuation by said element to connect said source to said exhaust passage.

4. An hydraulic operating mechanism for a reciprocable element of a machine tool comprising, in combination, a reversible hydraulic piston and cylinder motor for reciprocating said element, a reversible direction valve having a free moving piston, a source of fluid under pressure, two pressure passages adapted for connection to said source and leading respectively to said valve at opposite sides of said piston, two supply passages leading from said valve between said pressure passages respectively to opposite ends of said motor, an exhaust passage leading from said valve between said supply passages, said valve piston in one end position serving to connect one of said supply passages to one of said pressure passages and the other of said supply passages to said exhaust passage and in the other end position to connect said other supply passage to the other of said pressure passages and said one supply passage to said exhaust passage, two pilot valves interposed respectively in said pressure passages and adapted for selective actuation by said element, each of said pilot valves upon being actuated by said element acting to open the associated pressure passage to said source and to effect movement of the other pilot valve into position to connect the other pressure passage to said exhaust passage whereby to control said valve piston, and a stop valve interposed between said source and said pilot valves and adapted for actuation by said element to close communication of said pressure passages with said source.

5. An hydraulic operating mechanism for a reciprocable element of a machine tool comprising, in combination, a reversible hydraulic piston and cylinder motor for reciprocating said element, a reversible direction valve having a free moving piston, a source of fluid under pressure, two pressure passages adapted for connection to said source and leading respectively to said valve at opposite sides of said valve piston, two supply passages leading from said valve between said pressure passages respectively to opposite ends of said motor, an exhaust passage leading from said valve between said supply passages, said valve piston in one end position serving to connect one of said supply passages to one of said pressure passages and the other of said supply passages to said exhaust passage and in the other end position to connect said other supply passage to the other of said pressure passages and said one supply passage to said exhaust passage, two restricted exhaust passages branching respectively from said supply passages, two pilot valves interposed respectively in said pressure passages and also in said restricted passages, each pilot valve being adapted for actuation by said element to open the associated pressure passage to said source and close the associated exhaust passage and to effect movement of the other pilot valve into position to connect the other pressure passage to said first mentioned exhaust passage and to open the other restricted exhaust passage, and valve means responsive to the movement of said element for opening and closing said first mentioned exhaust passage.

6. An hydraulic operating mechanism for a reciprocable machine tool element comprising, in combination, a reversible hydraulic piston and cylinder motor for reciprocating said element, two fluid supply passages opening respectively to opposite ends of said motor, a source of fluid under pressure, an exhaust passage, a reversible direction valve movable in opposite directions to connect said source selectively to either of said supply passages and said exhaust passage to the other of said supply passages, two restricted exhaust passages branching respectively from said supply passages, valve means interposed in said restricted passages and operable in synchronism with said reversing valve selectively to close either restricted passage and to open the other restricted passage when the associated supply passages are connected respectively to said source and said first mentioned exhaust passage, and valve means for opening and closing said first mentioned exhaust passage.

7. An hydraulic operating mechanism for a reciprocable machine tool element comprising, in combination, a reversible hydraulic piston and cylinder motor for reciprocating said element, two fluid supply passages opening respectively to opposite ends of said motor, a source of fluid under pressure, an exhaust passage, a reversible direction valve movable in opposite directions to connect said source selectively to either of said supply passages and said exhaust passage to the other of said supply passages, two exhaust passages branching respectively from said supply passages, two independently adjustable orifices interposed respectively in said last mentioned exhaust passages, valve means automatically operable to close either of said last mentioned exhaust passages when the associated supply passage is connected to said source, and valve means operable upon movement of said element into different predetermined positions selectively to open and close said first mentioned exhaust passage.

8. An hydraulic operating mechanism for a reciprocable machine tool element comprising, in combination, a reversible hydraulic piston and cylinder motor for reciprocating said element, two fluid supply passages opening respectively to opposite ends of said motor, a source of fluid under pressure, an exhaust passage, a reversible direction valve movable in opposite directions to connect said source selectively to either of said supply passages and said exhaust passage to the other of said supply passages, two exhaust passages branching respectively from said supply passages, two independently adjustable orifices interposed respectively in said last mentioned exhaust passages, two valves interposed respectively in said last mentioned exhaust passages, each of said last mentioned valves being adapted for selective actuation by said element to close one of said last mentioned exhaust passages when the associated supply passage is connected to said source and to effect movement of the other of said last mentioned valves into position to open the other of said last mentioned exhaust passages, and valve means selectively operable to open and close said first mentioned exhaust passage.

9. An hydraulic operating mechanism for a reciprocable machine tool element comprising, in combination, a reversible hydraulic piston and cylinder motor for reciprocating said element, two fluid supply passages leading respectively to opposite ends of said motor, a source of liquid fluid under pressure, an unrestricted exhaust passage, two restricted exhaust passages each including an independently adjustable restriction orifice, and valve means for connecting said source and said unrestricted exhaust passage alternately and reversibly to said supply passages and for effecting the discharge of exhaust fluid from said motor selectively through said unrestricted exhaust passage or alternately through said restricted exhaust passages.

10. An hydraulic operating mechanism for a reciprocable machine tool element comprising, in combination, a reversible hydraulic piston and cylinder motor for reciprocating said element, two fluid supply passages leading respectively to opposite ends of said motor, a source of liquid fluid under pressure, an unrestricted exhaust passage, exhaust means including two restriction orifices, direction valve means automatically operable upon movement of said element into one end position to connect one of said supply passages to said source and to effect the discharge of fluid from the other of said supply passages through said exhaust passage or one of said orifices while preventing the discharge of fluid from said one supply passage through the other of said orifices, and upon movement of said element into the other end position to connect said other supply passage to said source and to effect the discharge of fluid from said one supply passage through said exhaust passage or said other of said orifices while preventing the discharge of fluid from said other supply passage through said one of said orifices, and valve means selectively operable to open and close said exhaust passage.

11. An hydraulic operating mechanism for a reciprocable machine tool element comprising, in combination, a reversible hydraulic piston and cylinder motor for reciprocating said element, two fluid supply passages leading respectively to opposite ends of said motor, a source of liquid fluid under pressure, an unrestricted exhaust passage, exhaust means including two restriction orifices, multiple direction control valve means automatically operable upon movement of said element into one end position to connect one of said supply passages to said source and to effect the discharge of fluid from the other of said supply passages through said exhaust passage or one of said orifices while preventing the discharge of fluid from said one supply passage through the other of said orifices, and upon movement of said element into the other end position to connect said other supply passage to said source and to effect the discharge of fluid from said one supply passage through said exhaust passage or said other of said orifices while preventing the discharge of fluid from said other supply passage through said one of said orifices, said orifices being independently adjustable so that the rate of movement of said element may be regulated to be equal in both directions or selectively greater in either direction than in the other, and valve means selectively operable to open and close said exhaust passage.

12. An hydraulic operating mechanism for a reciprocable machine tool element comprising, in combination, a reversible hydraulic piston and cylinder motor for reciprocating said element, two fluid supply passages opening respectively to opposite ends of said motor, a source of fluid under pressure, an exhaust passage, a reversible direction valve movable in opposite directions to connect said source selectively to either of said supply passages and said exhaust passage to the other of said supply passages, two exhaust passages branching respectively from said supply passages, two independently adjustable orifices interposed respectively in said last mentioned exhaust passages, valve means automatically operable to close either of said last mentioned exhaust passages when the associated supply passage is connected to said source, valve means operable upon movement of said element into different predetermined positions selectively to open and close said first mentioned exhaust passage, and means automatically operable upon movement of said element into a predetermined position to adjust one of said orifices.

13. An hydraulic operating mechanism for a reciprocable element of a machine tool comprising, in combination, an hydraulic motor for driving said element, means for supplying fluid under pressure to said motor, means for exhausting fluid from said motor and including an adjustable restriction orifice for controlling the rate of travel of said element, said orifice comprising a rotary valve member having a tapered peripheral port coacting with a registering port, a pinion coaxially fixed on said member, a gear rack meshing with said pinion, a piston and cylinder unit for reciprocating said rack, valve means for directing fluid under pressure selectively to opposite ends of said unit, and means for adjusting said valve means in response to the movement of said element into different predetermined positions.

14. An hydraulic operating mechanism for a reciprocable element of a machine tool comprising, in combination, an hydraulic motor for driving said element, means for supplying fluid under pressure to said motor, means for exhausting fluid from said motor and including an adjustable restriction orifice for controlling the rate of travel of said element, said orifice comprising a valve member having a tapered port adjustable longitudinally across a registering port, a piston and cylinder unit for adjusting said valve member selectively into either of two positions, valve means for directing fluid under pressure selectively to either end of said unit and simultaneously to open the other end of said unit to exhaust, and means for adjusting said valve means in response to the movement of said element into different predetermined positions.

15. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, and detent means for yieldably holding said valve members in position of adjustment.

16. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, and manual means for adjusting one of said valve members into either of its positions.

17. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, a piston and cylinder unit for adjusting one of said valve members from inoperative position into operative position, and valve means for supplying fluid under pressure to said unit.

18. An hydraulic operating mechanism for a movable machine tool element, a base for supporting said element, a piston and cylinder motor for driving said element, valve means including two pilot valves mounted in fixed position on said base and operable respectively to effect reverse movements of said element, each pivot valve comprising a casing and a valve member movable therein and projecting therefrom, control means on said element, each member having an inoperative position and an operative position for engagement by said control means, a source of fluid under pressure, two passages cross-connecting said casings and controlled by said members for selective connection to said source to automatically return either member into operative position upon movement of the other member into inoperative position by said control means, said control means being adjustable on occasion to be ineffective to adjust one of said members into inoperative position, and automatic means operable by said element to provide a dwell for said element and then to elevate the other of said members into operative position to effect a delayed reversal of said element.

19. A machine tool comprising, in combination, a base, a carriage reciprocable on said base, an hydraulic motor for reciprocating said carriage, a control system for said motor and including a member adapted for actuation to effect reversal of movement of said carriage, an abutment normally coacting with said member upon movement of said carriage into a predetermined end position to effect such reversal, and being capable of relative adjustment out of cooperative relation with said member to permit additional movement of said carriage past said end position, abutment means for stopping said carriage in a second predetermined end position at the end of said additional movement, and means automatically operable to provide a predetermined dwell for said carriage in said second end position and then to actuate said control system to effect said reversal of movement.

20. A machine tool comprising, in combination, a base, a carriage reciprocable on said base, an hydraulic motor for reciprocating said carriage, a control system for said motor and including a member adapted for actuation to effect reversal of movement of said carriage, an abutment normally coacting with said member upon movement of said carriage into a predetermined end position to effect such reversal, and being capable of relative adjustment out of cooperative relation with said member to permit additional movement of said carriage past said end position, abutment means for stopping said carriage in a second predetermined end position at the end of said additional movement, a time device for actuating said control system after a dwell period to effect said reversal of movement, and means operable by said carriage as an incident to said additional movement to institute operation of said time device.

21. A machine tool comprising, in combination, a base, a carriage reciprocable on said base, an hydraulic motor for reciprocating said carriage, an hydraulic control system for said motor and including a valve adapted for actuation to effect reversal of movement of said carriage, an abutment on said carriage normally in position to actuate said valve upon movement of said carriage into a predetermined end position, and being capable of adjustment out of cooperative relation with said valve to permit an additional movement of said carriage past said end position, abutment means for stopping said carriage in a second predetermined end position at the end of said additional movement, means including a piston and cylinder unit for actuating said valve to effect said reversal of movement, a source of fluid under pressure, a time delay device operable to connect said source to said unit after a dwell period, and a valve operable by said carriage as an incident to said additional movement to initiate operation of said delay device to institute operation of said delay device.

22. A machine tool comprising, in combination, a base, a carriage reciprocable on said base, an hydraulic motor for reciprocating said carriage, an hydraulic control system for said motor and including a valve adapted for actuation to effect reversal of movement of said carriage, abutment means for stopping said carriage in a predetermined end position, means including a piston and cylinder unit for actuating said valve to effect said reversal of movement, a source of fluid under pressure, a time delay device operable to connect said source to said unit after a dwell period, and a valve operable by said carriage as an incident to movement into said end position to institute operation of said delay device.

23. A machine tool comprising, in combination, a base, a movable element on said base, a piston and cylinder unit for driving said element, a source of fluid under pressure, a main exhaust passage, fluid passages leading to opposite ends of said unit, a direction valve operable selectively to connect said fluid passages respectively and reversibly to said source and said exhaust, a fluid pressure responsive valve in said exhaust passage, abutment means on said element for actuating said last mentioned valve in one direction to open said exhaust passage, a valve operable by said abutment means to direct fluid pressure to said last mentioned valve to close said exhaust passage, and restricted flow means for exhausting fluid from said unit when said exhaust passage is closed.

24. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, manual means for adjusting one of said valve members into either of its positions, and means for yieldably holding one of said valve members in position of adjustment.

25. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, and automatic means operable upon movement of said element into a predetermined position and effective after a predetermined delay to adjust one of said valve members from one position into the other position.

26. In a hydraulic operating mechanism for a movable machine tool element, control means mounted on said element for movement therewith, a control valve mounted in a fixed position and having a casing and a valve member movable therein and projecting therefrom, said member having an inoperative position and an operative position for engagement by said means, a cylinder on said casing, a piston in said cylinder and having a stop normally defining said inoperative position, and means for supplying pressure fluid to said cylinder to adjust said stop and thereby project said member into said operative position.

CARROLL R. ALDEN.

CERTIFICATE OF CORRECTION.

Patent No. 2,158,060.   May 16, 1939.

CARROLL R. ALDEN.

It is hereby certified that error appears in the printed specification of the above numbered patent requiring correction as follows: Page 2, second column, line 30, for "conduit" read conduit 30; page 3, first column, line 12, for "from" read for; page 10, first column, line 53, claim 18, for "pivot" read pilot; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.

tion, a base, a movable element on said base, a piston and cylinder unit for driving said element, a source of fluid under pressure, a main exhaust passage, fluid passages leading to opposite ends of said unit, a direction valve operable selectively to connect said fluid passages respectively and reversibly to said source and said exhaust, a fluid pressure responsive valve in said exhaust passage, abutment means on said element for actuating said last mentioned valve in one direction to open said exhaust passage, a valve operable by said abutment means to direct fluid pressure to said last mentioned valve to close said exhaust passage, and restricted flow means for exhausting fluid from said unit when said exhaust passage is closed.

24. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, manual means for adjusting one of said valve members into either of its positions, and means for yieldably holding one of said valve members in position of adjustment.

25. In an hydraulic operating mechanism for a movable machine tool element, control means mounted on said element for movement therewith, two pilot valves mounted in fixed position and each having a casing and a valve member movable therein and projecting therefrom, each member having an inoperative position and an operative position for engagement by said means, pressure fluid passages cross-connecting said casings and controlled by said members to automatically return either member into operative position upon movement of the other member into inoperative position by said means, and automatic means operable upon movement of said element into a predetermined position and effective after a predetermined delay to adjust one of said valve members from one position into the other position.

26. In a hydraulic operating mechanism for a movable machine tool element, control means mounted on said element for movement therewith, a control valve mounted in a fixed position and having a casing and a valve member movable therein and projecting therefrom, said member having an inoperative position and an operative position for engagement by said means, a cylinder on said casing, a piston in said cylinder and having a stop normally defining said inoperative position, and means for supplying pressure fluid to said cylinder to adjust said stop and thereby project said member into said operative position.

CARROLL R. ALDEN.

CERTIFICATE OF CORRECTION.

Patent No. 2,158,060. May 16, 1939.

CARROLL R. ALDEN.

It is hereby certified that error appears in the printed specification of the above numbered patent requiring correction as follows: Page 2, second column, line 30, for "conduit" read conduit 30; page 3, first column, line 12, for "from" read for; page 10, first column, line 53, claim 18, for "pivot" read pilot; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.